(12) United States Patent
Slama et al.

(10) Patent No.: US 12,134,349 B2
(45) Date of Patent: Nov. 5, 2024

(54) IMAGE PRESENTATION FOR REAR VIEW MIRROR SYSTEMS WITH CAMERAS

(71) Applicant: MOTHERSON INNOVATIONS COMPANY LIMITED, London (GB)

(72) Inventors: Alexander Slama, Stuttgart (DE); Matthias Koller, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 106 days.

(21) Appl. No.: 17/436,425

(22) PCT Filed: Feb. 20, 2020

(86) PCT No.: PCT/EP2020/054504
§ 371 (c)(1),
(2) Date: Sep. 3, 2021

(87) PCT Pub. No.: WO2020/182439
PCT Pub. Date: Sep. 17, 2020

(65) Prior Publication Data
US 2022/0161724 A1      May 26, 2022

(30) Foreign Application Priority Data

Mar. 8, 2019    (DE) .......................... 10 2019 105 993

(51) Int. Cl.
*B60R 1/06* (2006.01)
*B60R 1/12* (2006.01)

(52) U.S. Cl.
CPC ........ *B60R 1/06* (2013.01); *B60R 2001/1253* (2013.01); *B60R 2300/101* (2013.01); *B60R 2300/8026* (2013.01)

(58) Field of Classification Search
CPC ...... B60K 2370/176; B60K 2370/1868; B60K 2370/21; B60K 2370/52; B60K 2370/797;
(Continued)

(56) References Cited

U.S. PATENT DOCUMENTS

| 6,304,187 B1 * | 10/2001 | Pirim | A61B 5/1103 340/576 |
| 2005/0240342 A1 * | 10/2005 | Ishihara | G08G 1/167 701/1 |

(Continued)

FOREIGN PATENT DOCUMENTS

| DE | 10 2018 202387 B3 | 5/2019 |
| WO | WO 2019/040711 | 2/2019 |

OTHER PUBLICATIONS

International Search Report and Written Opinion dated Apr. 28, 2020 of International application No. PCT/EP2020/054504.

(Continued)

*Primary Examiner* — Nathnael Aynalem
(74) *Attorney, Agent, or Firm* — Jones Day

(57) ABSTRACT

A rear view mirror system for motor vehicles comprising a rear view mirror device that comprises a rear view mirror base to be attached to a vehicle, a rear view mirror head attached to the rear view mirror base, and a mirror element arranged in the rear view mirror head and being transparent or translucent from inside of the rear view mirror head. An actuator enables an orientation of the mirror element to be adjusted by rotating and/or tilting the mirror element and/or the rear view mirror head. A camera is arranged inside the rear view mirror head behind the mirror element for recording a camera view (CV) with a first viewing angle of the surroundings of the vehicle at least through the mirror element, wherein a control unit processes the camera view (CV) received form the camera to provide a monitor view (MV) with a second viewing angle being smaller than the first viewing angle being displayed on a monitor to provide the monitor view (MV) to a driver of the vehicle.

22 Claims, 4 Drawing Sheets

(58) Field of Classification Search
CPC .............. B60K 35/00; B60K 2370/152; B60K 2370/1526; B60K 2370/1529; B60K 2370/1531; B60K 2370/1533; B60K 2370/736; B60K 2370/739; B60R 1/00; B60R 2300/70; B60R 2300/80; B60R 2300/802; B60R 11/04; B60R 2001/1215; B60R 11/0235; B60R 2011/0276; B60R 2300/205; B60R 1/06; B60R 1/04; B60R 1/02; B60R 1/025; B60R 2001/1253; B60R 2001/1223; B60R 2300/101; B60R 2300/8026; B60R 2300/8066; B60R 1/07; B60R 1/072; B60R 1/064; B60R 1/066; H04N 7/181; H04N 7/183; G02B 27/01
USPC ........................................................ 348/148
See application file for complete search history.

(56) References Cited

U.S. PATENT DOCUMENTS

| | | | |
|---|---|---|---|
| 2011/0254957 A1 | 10/2011 | Eder | |
| 2017/0355314 A1* | 12/2017 | May | G06V 10/25 |
| 2018/0312113 A1* | 11/2018 | Hirano | G08B 21/06 |
| 2019/0146297 A1* | 5/2019 | Lynam | G02F 1/153 |
| | | | 359/265 |
| 2021/0206319 A1* | 7/2021 | Nagashima | H04N 7/18 |

OTHER PUBLICATIONS

Examination Report dated Sep. 11, 2019 for DE Application No. 10 2019 105 993.3.

\* cited by examiner

IMAGE PRESENTATION FOR REAR VIEW MIRROR SYSTEMS WITH CAMERAS

CROSS-REFERENCE TO RELATED APPLICATIONS

This application is a National Stage Entry of International Patent Application No. PCT/EP2020/054504, filed Feb. 20, 2020, which claims the benefit of priority to German Patent Application No. 10 2019 105 993, filed Mar. 8, 2019, each of which is incorporated by reference in its entirety for all purposes.

FIELD OF THE INVENTION

The invention relates to a rear view mirror system, to a vehicle comprising such rear view mirror system and to a method for operating such a rear view mirror system.

BACKGROUND OF THE INVENTION

Motor vehicles are usually equipped with exterior mirrors on both sides in the driver's field of view, which detect the surrounding of the motor vehicle at least in a rear view direction. Camera monitor systems shall support the driver by providing views to the surrounding of the vehicle in addition to the conventional rear view mirrors. The camera can be arranged at any position of the vehicle. In order to receive images from the surrounding in a wide angle view, cameras might be equipped with fish eye lenses or the cameras may obtain wide angle views from mirrors creating the wide angle view by its curved surface. In case of applying specially shaped reflectors, the cameras do not need to be positioned at the outside of the vehicle surface but can be positioned in more hidden positions.

FR 2794700 A1 discloses the use of a convex mirror reflecting a wide angle view towards a camera. Such received camera images are distorted requiring an image processing applying a geometrical correction function to the distorted images from the convex mirror to obtain a non-distorted two-dimensional wide angle view. The advantage of such solution is the known relation between a fixed camera position and a fixed mirror position with a known mirror shape.

In order to safe space and to avoid additional functional parts on the outside of vehicles cameras might be placed inside the housing of already present rear view mirrors. Cameras inside rear view mirrors do not change the outer surface of the vehicle avoiding additional opening in the car body or additional camera arms that have to be extended at the start of the journey or protrude from the body in a stationary position. The advantage of using existing rear view mirrors to house the camera is also their position of the rear-view mirrors protruding from the outer wall of the vehicle due to its rear view function, so that cameras arranged in them can provide a good overview of the rear traffic situation without applying complex mirror systems to obtain the rear traffic view. Cameras can also be positioned in the rearview mirror to observe the traffic ahead. However, the observation of the rear and forward traffic situation via a camera view displayed on a monitor should not depend on the orientation of the rear view mirror. The orientation of rear view mirrors is adjusted to the position, size and viewing direction of the driver and differ from driver to driver. In certain situation the driver may change the mirror orientation during his journey. This should not affect the view provided on the monitor in order to ensure that the monitor always presents the view to the driver appropriate for driving security.

US 2011/254957 A1 relates to image rectification for a vehicle, which comprises a display device, in order to show modified images and a screen for receiving the recorded images, which have been improved by image rectification. Furthermore, the known system comprises image rectification in communication with the display device and the screen, so that pixels, which are located in the recorded images, are improved by reorientation or repositioning of the pixels from a first position to a second position using a transmission or transfer process.

An exterior rearview mirror assembly for mounting at a vehicle according to WO 2019/040711 A1 includes a mounting arm configured for attachment at an exterior portion of the vehicle, and a mirror head having a mirror casing, a mirror reflective element and a mirror actuator. The mounting arm is received through an aperture in the mirror casing and the mirror actuator is attached at the mounting arm inside the mirror casing. The mirror actuator is electrically operable to adjust the mirror reflective element and the mirror casing relative to the mounting arm. The aperture allows for movement of the mirror casing relative to the mounting arm during operation of the mirror actuator. A powerfold actuator may be operable to pivot the mirror head relative to the base portion between a folded or non-use position and an extended or use position.

It would be desirable that a camera monitor system can be installed without changing the outer surface of the vehicle and simultaneously always providing the view appropriate for driving security to the driver regardless of the camera orientation.

SUMMARY OF THE INVENTION

It is an object of the invention to provide a camera monitor system being installed without changing the outer surface of the vehicle and simultaneously always providing the view appropriate for driving security to the driver regardless of the camera orientation.

This problem is solved by a rear view mirror system for motor vehicles comprising a rear view mirror device with a rear view mirror base to be attached to a vehicle and a rear view mirror head attached to the rear view mirror base comprising a mirror element arranged in the rear view mirror head and being transparent or translucent from inside of the rear view mirror head, wherein an actuator enables adjusting an orientation of the mirror element by rotating and/or tilting the mirror element and/or the rear view mirror head, wherein a camera is arranged inside the rear view mirror head behind the mirror element for recording a camera view with a first viewing angle of the surroundings of the vehicle at least through the mirror element, wherein a control unit processes the camera view received from the camera to provide a monitor view with a second viewing angle being smaller than the first viewing angle being displayed on a monitor to provide the monitor view to a driver of the vehicle, where the control unit is adapted to extract the monitor view from the camera view as part of the camera view, with the monitor view being kept constant regardless of the camera orientation, and/or the control unit is adapted to re-calibrate the camera with respect to the orientation of the mirror element relative to the camera in case of the rear view mirror device enables movements of the mirror element relative to the camera, or the control unit is adapted to re-calibrate the camera with respect to the orientation of the mirror element relative to the rear view mirror base in case the rear view mirror device enables movement of the mirror element and the camera together with the rear view mirror head.

The mirror element can be rotated and/or tilted either as separate element in the rear view mirror head leaving the rear view mirror head in a non-changed position or as an element being fixed to the rear view mirror head, where the whole rear view mirror head is rotated and/or tilted in order to rotate and/or tilt the mirror element.

The rear view mirror system according to the present invention is a hybrid system comprising a conventional rear view mirror device combined with a camera monitor system, which denotes a system, where a camera providing views of the surrounding of the vehicle in addition to the mirror element is connected to the monitor via data connections via a control unit further processing the images from the vehicle surrounding recorded by the camera. The camera may record the camera view of the rear traffic through the mirror element or may record the front traffic though the housing of the rear view mirror head being translucent. The camera might be any suitable camera providing digital images from the surroundings. The camera can be equipped with different lenses to provide a wider angle view or a small angle view or apply a zoom to provide an adaptable viewing angle. The control unit comprises a processor, where image processing software is installed to process the received images depending on the camera orientation and its alignment relative to the vehicle. The monitor can be any suitable monitor, where its screen is adapted to display the images or video stream received the camera and processed by the control unit. The mirror element is reflective for environmental light but transparent or translucent (light passes the mirror element, but the intensity is slightly reduced) from the other side or backside towards the inner volume of the rear view mirror head in order to enable the camera to record the surroundings of the vehicle through the mirror element. Suitable materials for the mirror element are glass, plastic or thin metallic layer such as layers of chromium or chromium alloys. Therefore, the camera has to be calibrated with respect to the mirror element in front of the camera resulting in different optical properties along the optical path of the camera compared to a situation, where no mirror element is in front of the camera. This basic calibration can be performed in a standard arrangement with mirror element and camera being in a standard position (middle position or predetermined reference orientation) in absolute terms and relative to each other. However, when turning the mirror element relative to the camera orientation, either be rotating the mirror or rotating the rear view mirror head with fixed mirror element, the optical properties along the optical path changes requiring a re-calibration in order to provide a constant image quality of the monitor view. In case of cameras rotating or tilting together with the mirror element or the rear view mirror head, the basic calibration is also correct for any rotated and/or tilted position, but the position of the monitor view, which should be stable on the monitor moves within the camera view depending on the changed camera position. Hence, if the camera orientation with respect to the vehicle or relative to the mirror element changes, this new orientation has to be taken into account for the image quality, detection algorithm, ADAS or overlays like distance or steering lines which are additionally displayed on top of the monitor view to put them into the intended or right position. Since the monitor view is table the additional information can be displayed in the same manner as before the rotation and/or tilting of the mirror element.

The system according to the present invention avoids any mechanical solution, where the camera is mechanically rotated by an additional actuator to compensate for any movement of the mirror element or rear view mirror head. Also the quality of the recorded image or video stream is maintained at its desired level regardless of the relative orientation between mirror element and camera by the image correction applied according to the present invention.

Therefore, the rear view mirror system according to the present invention provides a camera monitor system being installed without changing the outer surface of the vehicle and simultaneously always providing the view appropriate for driving security to the driver regardless of the camera orientation.

In an embodiment the camera is adapted to provide a camera view covering the monitor view direction for all possible orientations of the rear view mirror head or the mirror element. Than the monitor view can be displayed regardless of the orientation of the rear view mirror head or the mirror element.

In another embodiment the control unit provides the monitor view by cutting the monitor view out of the camera view, with the position of the monitor view in the camera view being a function of the orientation of the rear view mirror head and/or the mirror element relative to the orientation of the camera. This enables the control unit to obtain the monitor view in a simple and effective way out of the camera view.

In another embodiment the control unit performs an initial calibration for the camera in a predetermined reference orientation of the camera. The initial calibration improves the recorded quality of the camera view and the derived monitor view, since the mirror element has an optical effect on the recorded views due to its optical properties and orientation. Manufacturing deviations may lead to slightly varying camera and mirror element positions in the initial "normal" position of the camera relative to the mirror element which can be compensated by this initial calibration. In another preferred embodiment the monitor view corresponds to a viewing area being centralized within the camera view preferably in the predetermined reference orientation.

In another embodiment the camera is mounted in the rear view mirror head in a fixed position relative to the mirror element and a shift of the monitor view within the camera view is derived by the control unit from a current orientation of camera relative to the predetermined reference orientation. Here a change of the camera position can be determined be monitoring the camera position or by monitoring the position of the mirror element since the camera moves together with the mirror element. Here the camera can be mounted on a backing plate of the mirror element or within the rear view mirror head in case of a head moving rear view mirror head. In a preferred embodiment the current orientation is determined by a sensor monitoring the position of the mirror element. The current orientation of the camera view with respect to a reference position has to be known by the control unit in order to provide a proper cut-out of the monitor view out of the camera view.

In another embodiment the camera view comprises at least a part of the vehicle being recognized by the control unit at a certain position within the camera view and the current orientation is derived from a shift of the vehicle position in the camera view relative to its previous position. This embodiment avoids additional sensors as hardware component to determine any position. The visible vehicle part can be processed and used as reference by image processing means, which makes the system easier to install and more reliable. Corresponding algorithm to analyze the camera view with respect to vehicle parts are known to skilled people, where skilled people are able to select an appropriate reference point to execute such image processing. Reference points might be a door handle, an edge of the vehicle or other special reference points at the outside surface of the vehicle.

In an alternative embodiment the camera has a fixed position relative to the vehicle and does not move together with the mirror element and the orientation of the mirror element relative to the camera is derived by the control unit from rotation or tilting data received from a sensor monitoring the position of the mirror element. In this case the optical contribution of the mirror element to the recorded camera view changes with the relative orientation of the mirror element to the camera. To compensate for this effect, the orientation of the mirror element has to be determined in case of a movement of the rear view mirror head or mirror element.

In another embodiment the control unit uses calibration data internally stored for all possible orientations of the mirror element relative to the camera to dynamically adapt the calibration for each orientation of the mirror element. The re-calibration of the camera enables to receive camera views with the same quality regardless of the orientation of the mirror element relative to the camera.

In another embodiment the sensor monitors the actuator rotating or tilting the mirror element or the rear view mirror head to determine the orientation of the mirror element based on an actuator position. A sensor is able to determine any rotation or tilting very accurate, which on the other hand determines the orientation of the mirror element with respect to the vehicle and therefore with respect to the camera.

In another embodiment a processing algorithm is installed in the control unit to execute camera calibration and extraction of the monitor view from the camera view. The algorithm may apply image recognition to determine the required orientation. It may alternatively use orientation data and a look-up table where the to be applied re-calibration is listed as a function of the orientation of the mirror element for all possible orientations of the mirror element. Since the movability of the mirror element occurs only in a limited area of rotation and tilting, the look-up table can be established with a reasonable effort.

In another embodiment the camera view and the monitor view are images or video streams from the surrounding of the vehicle displayed on the monitor. In case of observing the traffic situation via the monitor the camera and monitor views are recorded and displayed as video streams.

In another embodiment the orientation of the mirror element and/or the predetermined reference orientation of the camera is adapted to be changed by the driver into a driver orientation for field of view adjustment, and the driver orientation can be stored in a memory unit connected with or comprised by the control unit, with the memory unit being adapted to store a plurality of driver orientations for a plurality of drivers.

The control unit can be adapted to control the actuator to bring the camera and/or the mirror element into anyone of the plurality of driver orientations, preferably upon driver recognition and/or driver input.

The invention further relates to a motor vehicle comprising at least one rear view mirror system according to the present invention. Here the monitor may display the surrounding of the vehicle on the driver side or on both sides. In an embodiment the system may enable the driver or any other passenger within the vehicle to select which part (right side, left side, full area) of the surroundings shall be displayed on the monitor. The term "motor vehicle" denotes to any vehicle, which is motor driven. The motor vehicle might by a car, a truck, a train, a boat or an airplane or any other motor vehicle. Therefore, the vehicle according to the present invention provides a camera monitor system being installed without changing the outer surface of the vehicle and simultaneously always providing the view appropriate for driving security to the driver regardless of the camera orientation.

In one embodiment the vehicle comprises a first rear view mirror system at the driver side of the vehicle and a second rear view mirror system at the co-driver side, wherein the monitor view can be selected from the monitor view of the first and/or second rear view mirror system.

The monitor can be arranged within the vehicle cabin, with preferably the monitor comprising
  a first monitor being associated with the first rear view mirror system,
  a second monitor being associated with the first rear view mirror system and/or
  a third monitor being associated with the first and second rear view systems.

The invention further relates to a method to operate a rear view mirror system in particular according to the present invention, for a motor vehicle comprising a rear view mirror device with a rear view mirror base to be attached to a vehicle and a rear view mirror head attached to the rear view mirror base comprising a mirror element arranged in the rear view mirror head and being transparent or translucent from inside of the rear view mirror head, wherein an actuator enables adjusting an orientation of the mirror element by rotating and/or tilting the mirror element and or the rear view mirror head, and wherein a camera is arranged inside the rear view mirror head behind the mirror element for recording a camera view with a first viewing angle of the surroundings of the vehicle at least through the mirror element, comprising steps of:
  receiving the camera view from the camera and processing the camera view by a control unit;
  providing a monitor view by the control unit with a second viewing angle being smaller than the first viewing angle to a monitor;
  displaying the monitor view on the monitor to provide the monitor view to a driver of the vehicle;
where in case of rotating and/or tilting the mirror element relative to the camera
  the control unit extracts the monitor view from the camera view as part of the camera view, where the monitor view is kept constant regardless of a camera orientation, and/or
  the control unit re-calibrates the camera with respect to the orientation of the mirror element relative to the camera in case of the rear view mirror device enables movements of the mirror element relative to the camera, or
  the control unit re-calibrates the camera with respect to the orientation of the mirror element relative to the rear view mirror base in case the rear view mirror device enables movement of the mirror element and the camera together with the rear view mirror head.

The method can comprise the further step of adapting the field of view by changing the predetermined reference orientation of the camera and/or the orientation of the mirror element into a driver orientation, and storing the driver orientation.

The method can also comprise the further step of bringing the camera and/or the mirror element into a selected driver orientation, preferably upon recognizing the driver and/or receiving a driver input.

Therefore, the method according to the present invention enables to operate a camera monitor system being installed without changing the outer surface of the vehicle and simultaneously always providing the view appropriate for driving security to the driver regardless of the camera orientation.

The above listed embodiments can be used individually or in any combination to provide the device and the process in accordance with the invention.

BRIEF DESCRIPTION OF THE DRAWINGS

These and other aspects of the invention are shown in detail in the illustrations as follows.

DETAILED DESCRIPTION OF EMBODIMENTS

Figure 1:
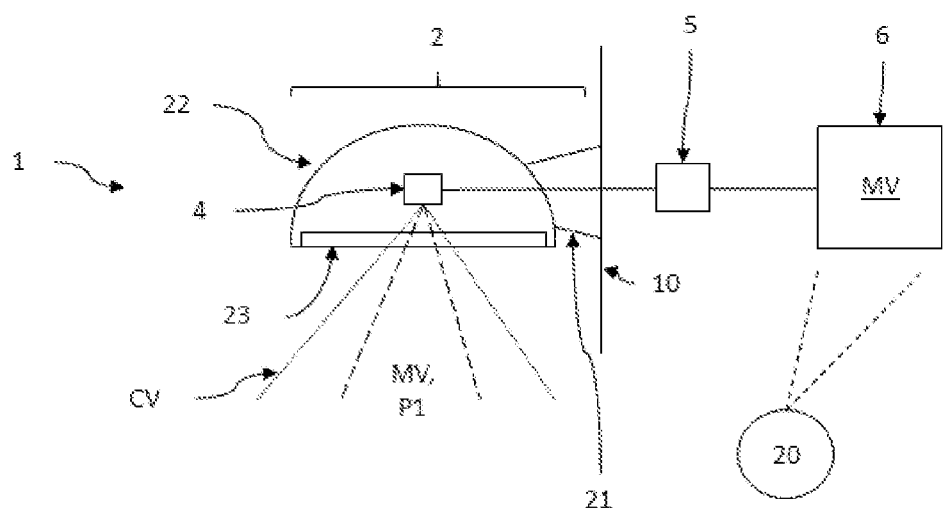
FIG. 1: a schematic view of an embodiment of the rear view mirror system according to the present invention.

FIG. 1 shows a schematic view of an embodiment of the rear view mirror system 1 according to the present invention comprising a rear view mirror device 2 with a rear view mirror base 21 being attached to a vehicle 10 (indicated by a solid line) and a rear view mirror head 22 attached to the rear view mirror base 21 comprising a mirror element 23 arranged in the rear view mirror head 22. The mirror element 23 is either transparent or translucent so that a camera 4 arranged in the inside of the rear view mirror head 22 is able to record the surrounding of the vehicle, here through the mirror element 23. Furthermore, an actuator 3 is arranged in the mirror head of mirror base to adjust an orientation of the mirror element 23 by rotating and/or tilting the mirror element 23 separately from the mirror head 22 or via rotating and/or tilting the rear view mirror head 22 with the mirror element 23 being rigidly mounted to the rear view mirror head, a so-called head mover. In both cases the camera 4 is arranged inside the rear view mirror head 22 behind the mirror element 23 for recording a camera view CV with a wide first viewing angle of the surroundings of the vehicle 10 through the mirror element 23, where the camera 4 is adapted to provide a camera view CV covering the monitor view MV direction for all possible orientations of the rear view mirror head 22 or the mirror element 23. The possible orientations of the rear view mirror head 22 are commonly limited to orientations usable to provide a direct view of the driver 20 to the rear traffic via the reflective mirror element 23. Therefore, the rear view mirror head 22 or the mirror element 23 can be rotated about a few degrees around a middle position denoted as P1. The same holds for tilting the rear view mirror head 22 or the mirror element 23. The monitor view MV corresponds to a viewing area being centralized within the camera view CM in the predetermined reference orientation P1, in this case the middle position of the rear view mirror head 22 or the mirror element 23. The control unit 5 processes the camera view CV received from the camera 4 to provide a monitor view MV with a second viewing angle being smaller than the first viewing angle being displayed on a monitor 6 to provide the monitor view MV to a driver 20 of the vehicle 10, where the control unit 5 is adapted to extract the monitor view MV from the camera view CV as part of the camera view CV, where the monitor view MV is kept constant regardless on a camera orientation, and/or the control unit 5 is adapted to re-calibrate the camera 4 with respect to the orientation of the mirror element 23 relative to the camera 4 in case of the rear view mirror device 2 enables movements of the mirror element 23 relative to the camera 4. Keeping the monitor view MV constant means that the monitor view MV shows the same viewing direction even when the camera 4 is rotated or tilted. In order to do so the control unit 5 provides the monitor view MV by cutting out the monitor view MV out of the camera view CV, where the position of the monitor view MV in the camera view CV is a function of the orientation of the rear view mirror head 22 or the mirror element 23 relative to the orientation of the camera 4. In order to provide a good viewing quality, the control unit 5 performs an initial calibration for the camera 4 in a predetermined reference orientation P1 (here: middle position of the rear view mirror head 22 or mirror element 23) of the camera 4. To show the rear traffic to the driver 20 the camera view CV and the monitor view MV can be images, preferably video streams from the surrounding of the vehicle 10 to be displayed on the monitor 6.

Figure 2:
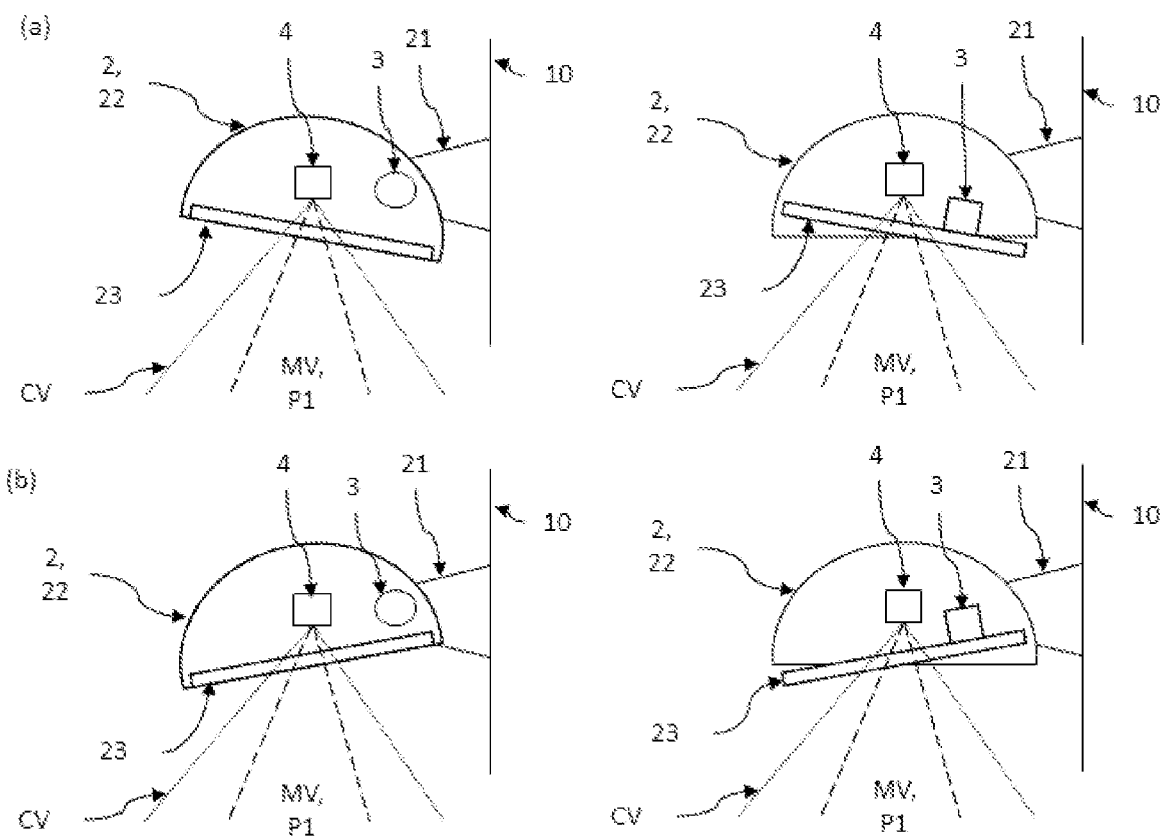
FIG. 2: shows a schematic view of camera view and monitor view of a camera fixed with respect to the vehicle in case of (a) right hand rotated mirror head or mirror element, and (b) left hand rotated mirror head or mirror element.

FIG. 2 shows a schematic view of camera view CV and monitor view MV of a camera 4 with fixed orientation with respect to the vehicle 10 (non-rotating and non-tilting camera 4) in case of (a) right hand rotated mirror head 22 (left part of FIG. 2) or mirror element 23 (right part of FIG. 2), and (b) left hand rotated mirror head 22 (left part of FIG. 2) or mirror element 23 (right part of FIG. 2). The orientation of the mirror element 23 relative to the camera 4 is derived by the control unit 4 from rotation or tilting data received from a sensor 7 monitoring the position of the mirror element 23. After having rotated and/or tilted the mirror element 23 relative to the camera 4, the initial calibration no longer applies to the current situation with changed orientation. Therefore, the control unit 5 uses calibration data internally stored for all possible orientations of the mirror element 23 relative to the camera 4 to dynamically adapt the calibration for each orientation of the mirror element 23. The used calibration data may be stored in a look-up table together with the corresponding rotation and tilting data. For the determined or derived rotation and/or tilting the control unit 5 simply applies the corresponding calibration data of the look-up table in order to perform a re-calibration of the camera 4 and the camera view CV. Regardless of the orientation of the rear view mirror head 22 or the mirror element 23 the monitor view MV corresponds to a viewing area being centralized within the camera view CM in the predetermined reference orientation P1. Such re-calibration might not be applied for embodiments, where the camera 4 rotates or tilts simultaneously with the mirror element 23 keeping the relative orientation between camera 4 and mirror element 23 constant. In such cases the initial calibration also applies for any later rotated or tilted orientation of the rear view mirror head 22 or mirror element 23.

Adapting the field of view by changing the predetermined reference orientation P1 of the camera 4 and/or the orientation of the mirror element 23 into a driver orientation, enables storing different driver orientations. Thus, bringing the camera 4 and/or the mirror element 23 into a selected driver orientation, preferably upon recognizing the driver and/or receiving a driver input, is possible.

Figure 3:
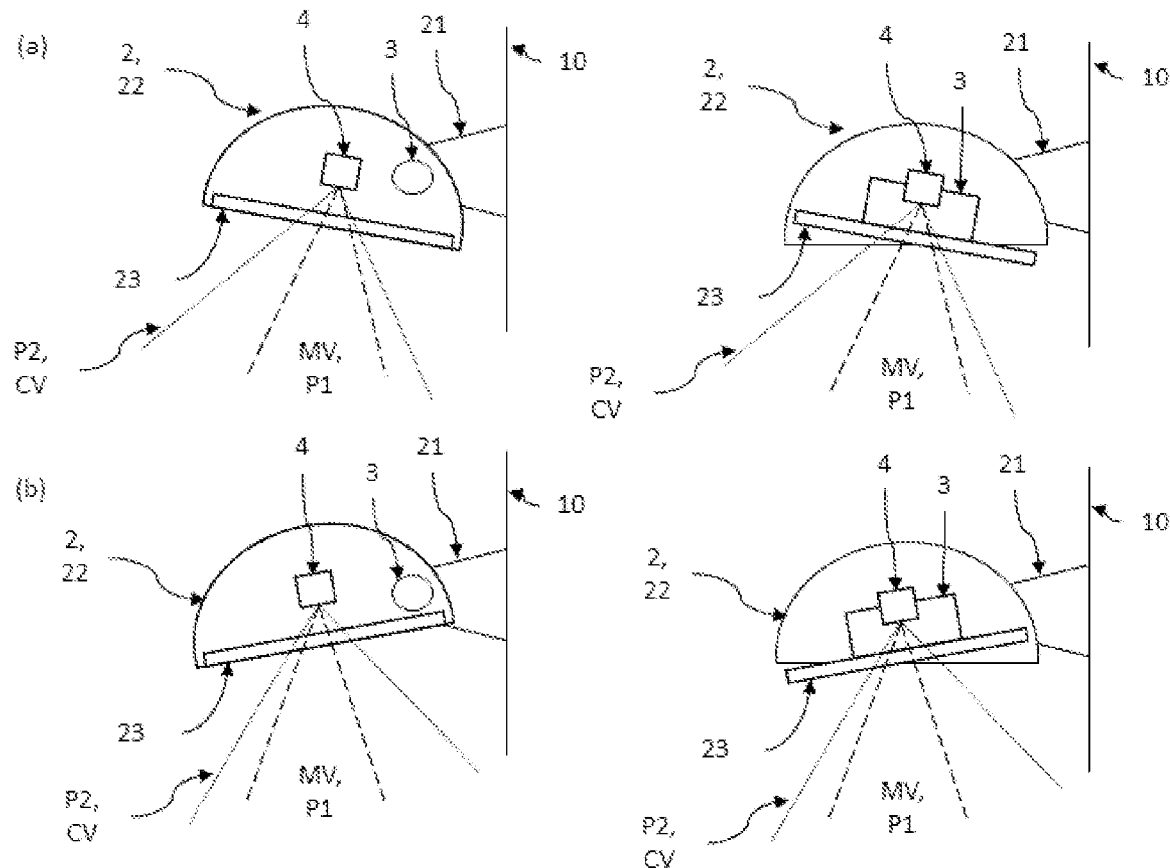
FIG. 3: shows a schematic view of camera view and monitor view of a camera rotating together with the mirror element in case of (a) right hand rotated mirror head or mirror element, and (b) left hand rotated mirror head or mirror element.

FIG. 3 shows a schematic view of camera view CV and monitor view MV of a camera 4 rotating together with the mirror element 23 in case of (a) right hand rotated mirror head 22 (left part of FIG. 3) or mirror element 23 (right part of FIG. 3), and (b) left hand rotated mirror head 22 (left part of FIG. 3) or mirror element 23 (right part of FIG. 3). In contrast to FIG. 2 here the orientation of the camera 4 relative to the mirror element 23 does not change. Therefore, a re-calibration of the camera 4 can be performed but is not as important as it is for the mounting shown in FIG. 2. However, when the camera 4 is mounted in the rear view mirror head 22 in a fixed position relative to the mirror element 23, the camera view CV moves simultaneously with the rotating and/or tilting mirror element from an initial position P1 to a later position P2, while the monitor view MV shall be displayed with a constant orientation according to the predetermined reference orientation P1 of the camera 4 regardless of any rotation or tilting of the mirror element 23. Therefore, the shift of the monitor view MV within the camera view CV is derived by the control unit 4 from a current orientation P2 of camera relative to the predetermined reference orientation P1. Regardless of the orientation of the rear view mirror head 22 or the mirror element 23 the monitor view MV corresponds to a viewing area being centralized within the camera view CM in the predetermined reference orientation P1.

Figure 4:
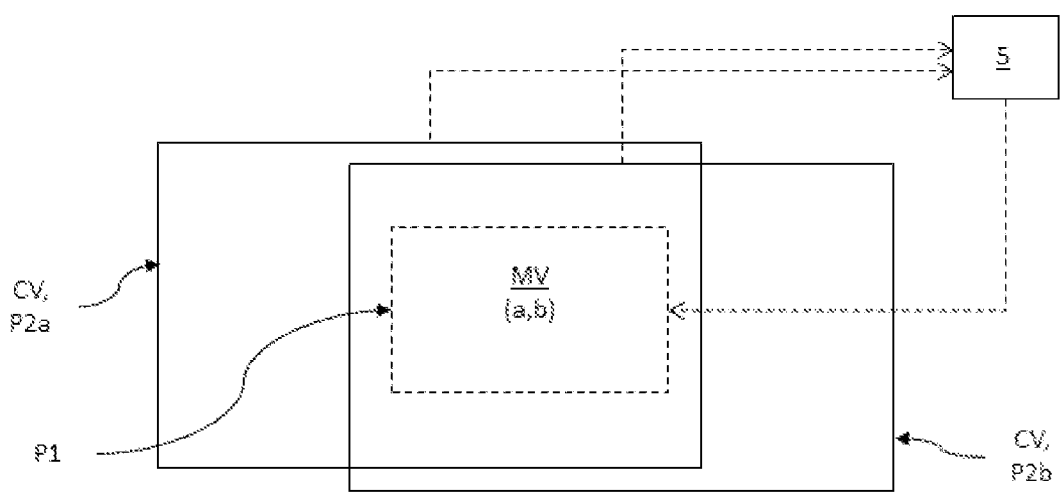
FIG. 4: shows the movement of the monitor view within the camera view in case of a camera rotating together with the mirror element.

FIG. 4 shows the relative movement of the monitor view MV within the camera view CV in case of a camera 4 rotating together with the mirror element. In principal, the camera view CV moves from an initial position or orientation P1 (not shown here) to a current position or orientation P2a corresponding to the positions shown in FIG. 3(a). From this position P2a the mirror element might be rotated to another current position or orientation P2b corresponding to the position shown in FIG. 3(b), while the monitor view MV stays in a constant direction P1. The control unit 5 provides the monitor view MV by cutting out the monitor view MV out of the camera view CV, where the position of the monitor view MV in the camera view CV is a function of the orientation of the rear view mirror head 22 or the mirror element 23 relative to the orientation of the camera 4. How the cut-out is performed in the correct area of the camera view CV is shown in the next figure.

Figure 5:
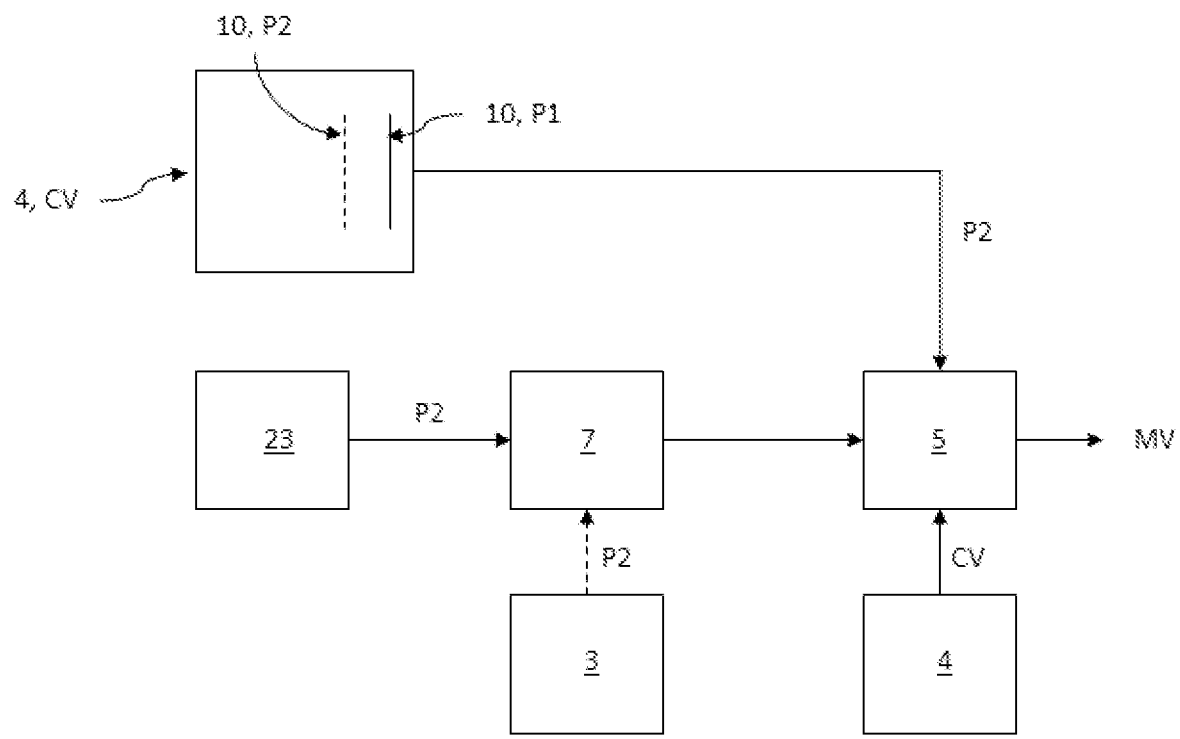
FIG. 5: shows schematically how the second position of the camera view will be determined.

FIG. 5 shows schematically how the second position P2 of the camera view CV and the corresponding position of the cut-out of the monitor view MV out of the camera view CV is determined. In one embodiment the current position P2 might be determined by a sensor 7 directly monitoring the position of the mirror element 23. In another embodiment the camera view CM may comprise at least a part of the vehicle 10 being recognized by the control unit 4 at a certain position within the camera view CV and the current orientation P2 is derived from a shift of this vehicle position in the camera view CV relative to its previous position. In another embodiment the sensor 7 may monitor the actuator 3 rotating or tilting the mirror element 23 or the rear view mirror head 22 to determine the orientation of the mirror element 23 based on an actuator position. In order to obtain the monitor view MV at the right position P1 from the camera view CV a processing algorithm is installed in the control unit 5 to execute camera calibration and extraction of the monitor view MV from the camera view CV.

Figure 6:
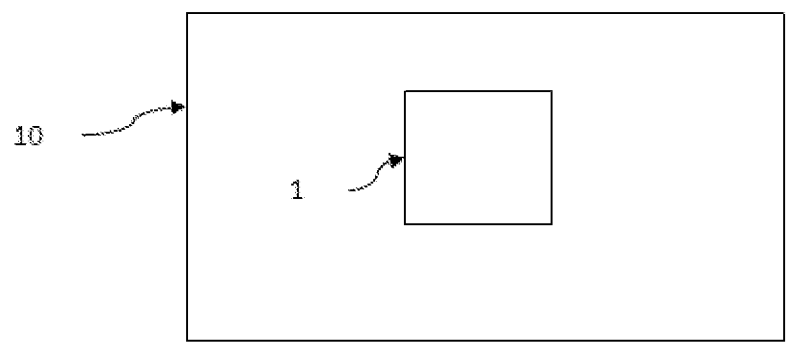
FIG. 6: shows an embodiment of the motor vehicle according to the present invention.

FIG. 6 schematically shows an embodiment of the motor vehicle 10 according to the present invention comprising a rear view mirror system 1 according to the present invention, where the monitor 6 may display the surrounding of the vehicle 10 on the driver side or on both sides. In an embodiment (not shown here) the system may enable the driver 20 or any other passenger within the vehicle 10 to select which part (right side, left side, full area) of the surroundings shall be displayed on the monitor 6. The term "motor vehicle" denotes to any vehicle, which is motor driven. The motor vehicle 10 might by a car, a truck, a train, a boat or an airplane or any other motor vehicle. The monitor 6 might be arranged on the dashboard or on the side of the door or window of the vehicle 10.

Figure 7:
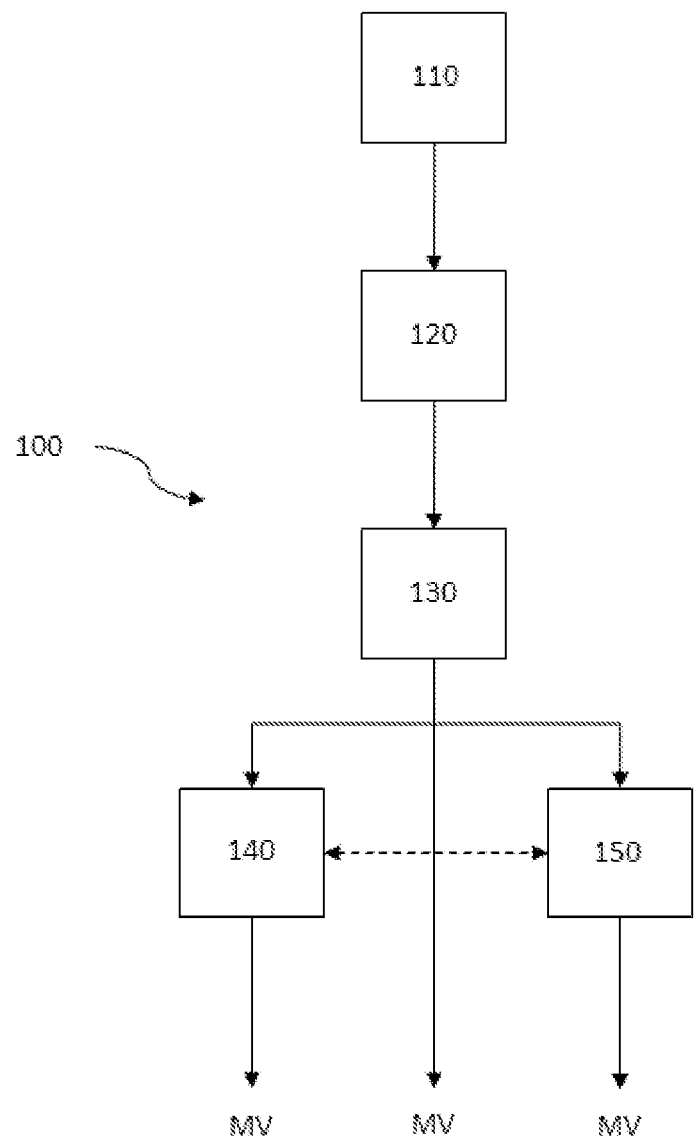
FIG. 7: shows an embodiment of the method according to the present invention.

FIG. 7 shows an embodiment of the method 100 according to the present invention to operate a rear view mirror system 1 according to the present invention for motor vehicles 10 comprising a rear view mirror device 2 with a rear view mirror base 21 to be attached to a vehicle 10 and a rear view mirror head 22 attached to the rear view mirror base 21 comprising a mirror element 23 arranged in the rear view mirror head 22 being transparent or translucent from inside of the rear view mirror head 22, where an actuator 3 enables adjusting an orientation of the mirror element 23 by rotating and/or tilting the mirror element 23 or the rear view mirror head 22, and where a camera 4 is arranged inside the rear view mirror head 22 behind the mirror element 23 for recording a camera view CV with a wide first viewing angle of the surroundings of the vehicle 10 through the mirror element 23, comprising steps of receiving 110 the camera view CV from the camera 4 and processing the camera view CV by a control unit 5; providing 120 a monitor view MV by the control unit 4 with a second viewing angle being smaller than the first viewing angle to a monitor 6; displaying 130 the monitor view MV on the monitor 6 to provide the monitor view MV to a driver 20 of the vehicle 10; where in case of rotating and/or tilting the mirror element 23 the control unit 5 extracts 140 the monitor view MV from the camera view CV as part of the camera view CV, where the monitor view MV is kept constant regardless on a camera orientation, and/or the control unit 5 re-calibrates 150 the camera 4 with respect to the orientation of the mirror element 23 relative to the camera 4 in case of the rear view mirror device 2 enables movements of the mirror element 23 relative to the camera 4. The camera view might be received from the control unit 5 as a video stream in form of a digital signal and applies suitable video processing to the digital video stream data. The video processing might also be used for correction with respect to distortion, aspheric corrections, object detection, hazard detection, initiation warnings based on the video processing and object classification. The resultant processed video stream is displayed on the monitor 6 as monitor view MV, which may comprise overlays indicating traffic situations, lane markers, distant lines, warning signals or symbols etc.

The embodiments shown here are only examples of the present invention and must therefore not be understood as restrictive. Alternative embodiments considered by the skilled person are equally covered by the scope of protection of the present invention.

LIST OF REFERENCE NUMERALS 1 rear view mirror system according to the present invention
2 rear view mirror device
21 rear view mirror base
22 rear view mirror head
23 mirror element
3 actuator
4 camera
5 control unit
6 monitor
7 position sensor
10 vehicle
20 driver
100 method to operate the rear view mirror system according to the present invention
110 receiving and processing the camera view from the camera
120 providing a monitor view by the control unit
130 displayed the monitor view on the monitor
140 extracting the monitor view from the camera view as part of the camera view
150 re-calibrating the camera with respect to the orientation of the mirror element relative to the camera
CV camera view
MV monitor view
P1 predetermined reference orientation of the camera
P2 current orientation of the camera
P2a current orientation of the camera in position (a) according FIG. 3
P2b current orientation of the camera in position (b) according FIG. 3

The invention claimed is:

1. A rear view mirror system for motor vehicles comprising:
an exterior rear view mirror device, comprising,
a rear view mirror base configured to be attached to a vehicle,
a rear view mirror head attached to the rear view mirror base, and
a mirror element arranged in the rear view mirror head, wherein the mirror element is completely transparent or translucent from inside of the rear view mirror head,
wherein an actuator enables an orientation of the mirror element to be adjusted by rotating and/or tilting one or more of the mirror element and the rear view mirror head
wherein a camera is arranged inside the rear view mirror head behind the mirror element for recording a camera view (CV) with a first viewing angle of the surroundings of the vehicle at least through the mirror element, wherein the camera has a fixed position relative to the vehicle and does not move together with the mirror element such that the rear view mirror device enables movement of the mirror element relative to the camera,
wherein a control unit processes the camera view (CV) received from the camera to provide a monitor view (MV) with a second viewing angle being smaller than the first viewing angle being displayed on a monitor to provide the monitor view (MV) to a driver of the vehicle,
wherein the control unit is adapted to extract the monitor view (MV) from the camera view (CV) as part of the camera view (CV), with the monitor view (MV) being kept constant regardless on the camera orientation, and
wherein the control unit is adapted to re-calibrate the camera with respect to the orientation of the mirror element relative to the camera.

2. The rear view mirror system according to claim 1, wherein the camera is adapted to provide a camera view (CV) covering the monitor view (MV) direction for all possible orientations of the rear view mirror head or the mirror element.

3. The rear view mirror system according to claim 1, wherein the control unit provides the monitor view (MV) by cutting the monitor view (MV) out of the camera view (CV), with the position of the monitor view (MV) in the camera view (CV) being a function of the orientation of one or more of the rear view mirror head and the mirror element relative to the orientation of the camera.

4. The rear view mirror system according to claim 1, wherein the control unit performs an initial calibration for the camera in a predetermined reference orientation (P1) of the camera.

5. The rear view mirror system according to claim 1, wherein the monitor view (MV) corresponds to a viewing area being centralized within the camera view (CM).

6. The rear view mirror system according to claim 4, wherein the camera is mounted in the rear view mirror head in a fixed position relative to the mirror element and a shift of the monitor view (MV) within the camera view (CV) is derived by the control unit from a current orientation (P2) of the camera relative to the predetermined reference orientation (P1).

7. The rear view mirror system according to claim 6, wherein the current orientation (P2) is determined by a sensor monitoring the position of the mirror element.

8. The rear view mirror system according to claim 6, wherein the camera view (CM) comprises at least a part of the vehicle being recognized by the control unit at a certain position within the camera view (CV) and the current orientation (P2) is derived from a shift of the vehicle position in the camera view (CV) relative to its previous position.

9. The rear view mirror system according to claim 1, wherein the camera has a fixed position relative to the vehicle and does not move together with the mirror element and the orientation of the mirror element relative to the camera is derived by the control unit from rotation or tilting data received from a sensor monitoring the position of the mirror element.

10. The rear view mirror system according to claim 9, wherein the control unit uses calibration data internally stored for all possible orientations of the mirror element relative to the camera to dynamically adapt the calibration for each orientation of the mirror element.

11. The rear view mirror system according to claim 7, wherein the sensor monitors the actuator rotating or tilting the mirror element or the rear view mirror head to determine the orientation of the mirror element based on an actuator position.

12. The rear view mirror system according to claim 1, wherein a processing algorithm is installed in the control unit to execute camera calibration and extraction of the monitor view (MV) from the camera view (CV).

13. The rear view mirror system according to claim 1, wherein the camera view (CV) and the monitor view (MV) are images or video streams from the surrounding of the vehicle displayed on the monitor.

14. The rear view mirror system according to claim 1, wherein
the orientation of one or more of the mirror element and the predetermined reference orientation (P1) of the camera is adapted to be changed by the driver into a driver orientation for field of view adjustment, and
the driver orientation can be stored in a memory unit connected with or comprised by the control unit, with the memory unit being adapted to store a plurality of driver orientations for a plurality of drivers.

15. The rear view mirror system according to claim 14, wherein the control unit is adapted to control the actuator to bring the camera and/or the mirror element into any one of the plurality of driver orientations.

16. A motor vehicle comprising at least one rear view mirror system according to claim 1.

17. The vehicle according to claim 16, comprising:
a first rear view mirror system at the driver side of the vehicle and a second rear view mirror system at the passenger side, wherein the monitor view (MV) can be selected from the monitor view of the first and/or second rear view mirror system.

18. The vehicle according to claim 16, wherein the monitor is arranged within the vehicle cabin, with the monitor comprising one or more of,
a first monitor being associated with the first rear view mirror system,
a second monitor being associated with the first rear view mirror system, or
a third monitor being associated with the first and second rear view systems.

19. A method for operating to operate a rear view mirror system for a motor vehicle, the rear view mirror system comprising an exterior rear view mirror device comprising a rear view mirror base configured to be attached to a vehicle, a rear view mirror head attached to the rear view mirror base, and a mirror element arranged in the rear view mirror head and being transparent or translucent from inside of the rear view mirror head, wherein an actuator enables an orientation of the mirror element to be adjusted by rotating and/or tilting at least one of the mirror element and the rear view mirror head, and wherein a camera is arranged inside the rear view mirror head behind the mirror element for recording a camera view (CV) with a first viewing angle of the surroundings of the vehicle at least through the mirror element, the method comprising steps of:
receiving the camera view (CV) from the camera and processing the camera view (CV) by a control unit;
providing a monitor view (MV) by the control unit with a second viewing angle being smaller than the first viewing angle to a monitor;
displaying the monitor view (MV) on the monitor to provide the monitor view (MV) to a driver of the vehicle; and
in response to rotating and/or tilting of the mirror element, extracting, by the control unit, the monitor view (MV) from the camera view (CV) as part of the camera view (CV), where the monitor view (MV) is kept constant regardless on a camera orientation, and
recalibrating, by the control unit, the camera with respect to the orientation of the mirror element relative to the camera, wherein the camera has a fixed position relative to the vehicle and does not move together with the mirror element such the rear view mirror device enables movements of the mirror element relative to the camera.

20. The method of claim 19, comprising the further step of:
adapting the field of view by changing the predetermined reference orientation (P1) of the camera and/or the orientation of the mirror element into a driver orientation, and
storing the driver orientation.

21. The method of claim 20, comprising the further step of bringing the camera and/or the mirror element into a selected driver orientation.

22. A rear view mirror system for motor vehicles comprising:
an exterior rear view mirror device, comprising,
a rear view mirror base configured to be attached to a vehicle,
a rear view mirror head attached to the rear view mirror base, and
a mirror element arranged in the rear view mirror head and being transparent or translucent from inside of the rear view mirror head,
wherein an actuator enables an orientation of the mirror element to be adjusted by rotating and/or tilting one or more of the mirror element and the rear view mirror head,
wherein a camera is arranged inside the rear view mirror head behind the mirror element for recording a camera view (CV) with a first viewing angle of the surroundings of the vehicle at least through the mirror element, and wherein the camera has a fixed position relative to the vehicle and does not move together with the mirror element such that the rear view mirror device enables movement of the mirror element relative to the camera,
wherein a control unit processes the camera view (CV) received from the camera to provide a monitor view (MV) with a second viewing angle being smaller than the first viewing angle being displayed on a monitor to provide the monitor view (MV) to a driver of the vehicle,
wherein the control unit is adapted to extract the monitor view (MV) from the camera view (CV) as part of the camera view (CV), with the monitor view (MV) being kept constant regardless on the camera orientation, and
wherein the control unit is adapted to re-calibrate the camera with respect to the orientation of the mirror element relative to the camera.

* * * * *